United States Patent [19]

Martin

[11] Patent Number: 4,707,612
[45] Date of Patent: Nov. 17, 1987

[54] BINARY CODING SYSTEM
[75] Inventor: Robert J. Martin, Lynchburg, Va.
[73] Assignee: Blue Bell, Inc., Greensboro, N.C.
[21] Appl. No.: 802,310
[22] Filed: Nov. 27, 1985
[51] Int. Cl.$^4$ .................... G06K 7/14; G06K 19/06
[52] U.S. Cl. .................................. 250/568; 235/454;
235/466; 235/494
[58] Field of Search ............... 250/566, 568; 235/494,
235/466, 474, 456, 454

[56] References Cited

U.S. PATENT DOCUMENTS 4,172,554  10/1979  Clarinval et al. .................... 235/466

Primary Examiner—Eugene R. LaRoche
Assistant Examiner—David Mis
Attorney, Agent, or Firm—Charles R. Rhodes; Judith E. Garmon

[57] ABSTRACT

A three channel, binary coding technique, especially adapted for identifying intermittently, erratically, or continuously moving objects along a linear path (conveyor track, roadway, or the like). Three parallel channels of coded information are each provided with some type of photoelectric, electronic, or mechanical indicating means or indicia representative of one of two logic states, which logic states on each channel change during each successive segment or interval thereon. A change in the timing channel indicates to a sensing means that a new binary bit of intelligence is to be transmitted. The order in which the coding channels change during the succeeding segment then indicate whether the binary bit being generated is a ONE, a ZERO, or in the alternative whether the reading is erroneous or invalid.

4 Claims, 5 Drawing Figures

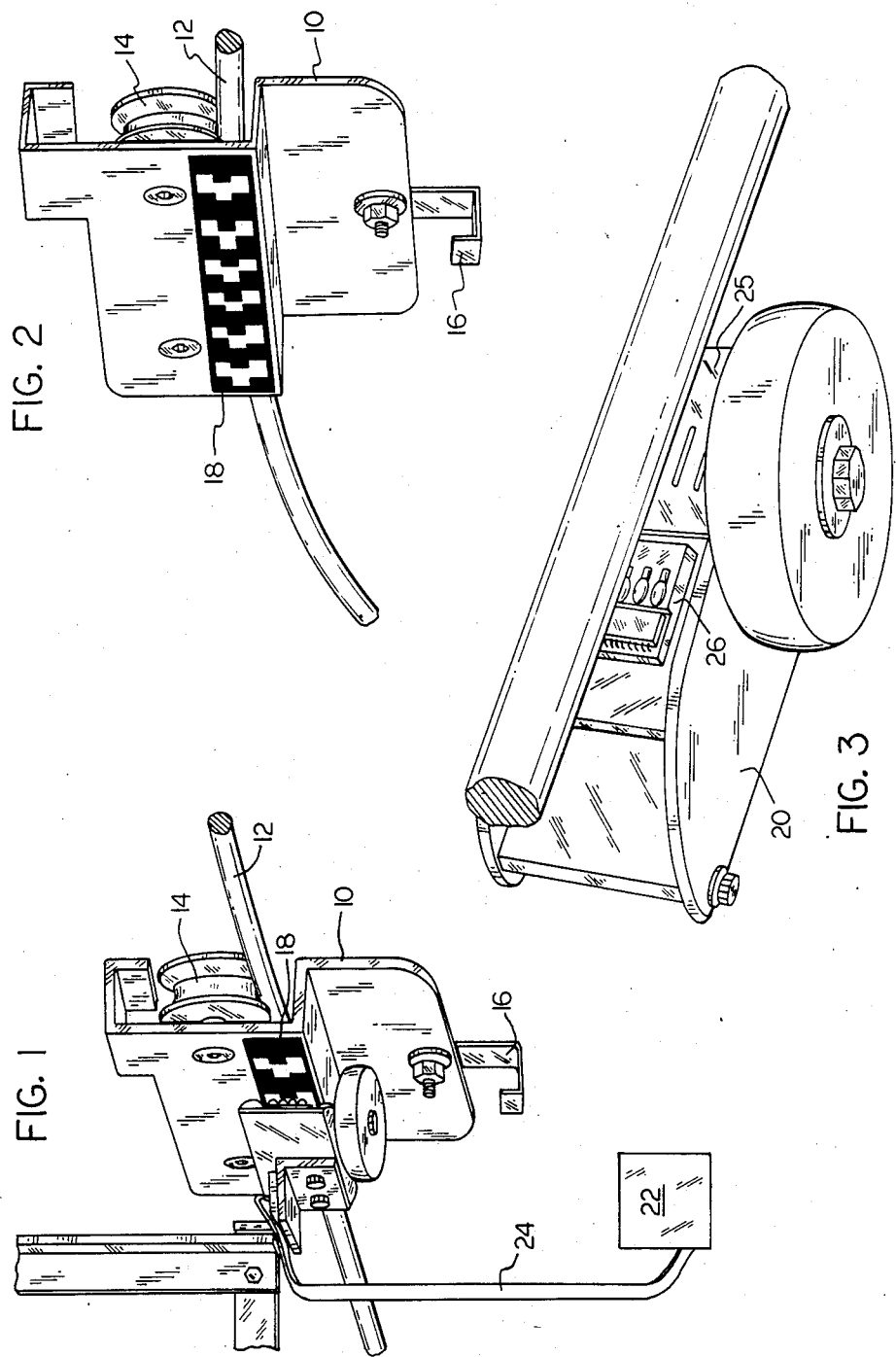

BINARY CODING SYSTEM

BACKGROUND AND SUMMARY OF THE PRESENT INVENTION

This invention relates to the coding of objects for identification or transmittal of intelligence relative thereto, and more particularly to a unique three channel, binary coding technique for more reliably and accurately coding and sensing the identification of such articles or transmission of intelligence relative thereto.

In recent years the use of machine readable codes to identify objects or provide pertinent information concerning such objects (such as price, stock numbers and the like) has increased considerably. For example, in many retail establishments, all merchandise is marked with a "bar code," and then a reader or sensing device for decoding such information is provided to clerks at check-out counters. The clerk merely passes the sensing device (reader) past the code, and all of the pertinent information is transmitted into the checkout register. This reduces manual computations, inventory, and the like.

In addition, manufacturing facilities utilize similar coding techniques to identify and maintain production and quality control records with regard to various objects, components, and subcomponents during the manufacturing thereof. Sometimes the object is stationary and the reading device is passed across the bar code. In other situations, the reading device is stationary, and objects bearing some type of code thereon are moved by the reading device. In the latter case, erroneous readings may occur as a result of the object to be identified moving at varying speeds, stopping, or changing direction. Most types of bar codes cannot adapt to such changing conditions.

Most coding techniques utilize a plurality of channels, each of which are provided with some type of indicating means or indicia therein representative of one of two logic states. Generally, the combination of logic states at any one time as one scans across the plurality of channels is directly indicative of a decimal number, a letter, or some other code. Examples of such types of coding techniques are shown and described in U.S. Pat. No. 3,453,419 to Torrey; U.S. Pat. No. 4,148,434 to Lorenzo; and Swiss Patent No. 401,552 to Arsenault et al. Another example of a coding technique is disclosed in IBM Technical Disclosure Bulletin entitled "Photostore Format," Vol. 9, No. 12 (May 1967). Each of these references, however, appear to involve some type of coding technique in which the binary code that appears across the channels at any instant is representative of a decimal number. Each also encounters the aforesaid problem when used in connection with intermittently, erratically, or continuously moving objects.

The present invention, on the other hand, is directed to a unique three channel binary coding technique which overcomes this problem. One of these channels is a timing channel and the other two are coding channels. The coding technique of the present invention adopts a concept in which the determination of whether the binary digit is a ONE or a ZERO is determined by the sequence in which the coding channels change their logical state as the relative movement between the object and reading device occurs, and not by the combination of logical states in which the channels exist at any particular instant. More specifically, the invention then is directed to an apparatus or system for generating coded information in binary form which can be read by a reading means. The code includes a medium applied to the moving object on which a linear strip of coded information is applied. The linear strip of information includes three parallel channels of coded information, one of the channels being a timing channel lying adjacent a first and second coding channel. Each of the channels includes some type of indicating means associated therewith which is representative of one of two logical states, which logical states change at prescribed intervals along the channel. The reading means includes a sensor in the form of a photodetector, mechanical detector, electrical switch contacts, or electrical sensors, for determining separately the logic states from each channel as the linear strip passes thereby. The linear strip is divided into longitudinal segments and subsegments extending across the three channels. The passing of three successive subsegments equals one segment and thus a single bit of binary information. The logic state of said channels in each segment and subsegment are so arranged that the sensing means can determine from the timing channel that a new bit reading is commencing and from the sequence of change in the coding channels whether the bit is a ONE, a ZERO, as well as whether the reading is valid or erroneous.

The coding technique of the present invention is unique in that an object to be identified may move at varying speeds, may stop, or may change direction without causing errors in reading its identification. The three channel code may also be adapted for use in other environments such as signalling, communications, key locks, pass words, card readers, etc., as well as identifying stationary objects.

The three channels are arranged parallel to each other and along the path in which the object to be identified moves. The code is recorded on the three channels in a number of ways, such as by colored markings, opaque and transparent markings, light and dark areas, holes, pins, pegs, or variations in surface shape, or any other means which are capable of representing logically true and false states which may be automatically read by some type of machine reader. The readers may include photodetectors, switch contacts, mechanical readers, or electrical sensors which detect the color, shape, transparency, presence or absence of holes, pegs, pins, or other physical attributes suitably encoded.

In the preferred embodiment, the reader is stationary and reads the codes from the passing object, but it is obvious that the object to be identified could be stationary while the reader is set in motion, or both the reader and the object to be identified could be in motion.

It is therefore an object of the present invention to provide a unique binary coding technique.

It is another object of the present invention to provide a coding technique of the type described which may reliably and accurately identify objects which are moving relative to the reading means.

A further object of the present invention is to provide a coding technique of the type described in which the determination of the identification is made by the order in which logic states change, rather than by the logical condition at an instantaneous point in time or space.

Other objects and advantages of the present invention will become obvious upon reading the following detailed description of a preferred embodiment along with the accompanying drawings in which:

FIG. 1 is a perspective view of a coded portion of a moving object (a hanger) and an associated reader;

FIG. 2 is a perspective view of the hanger alone and the manner in which it is suspended from a conveyor rail;

FIG. 3 is a perspective view of the sensing device alone;

DETAILED DESCRIPTION OF A PREFERRED EMBODIMENT

Figure 4:
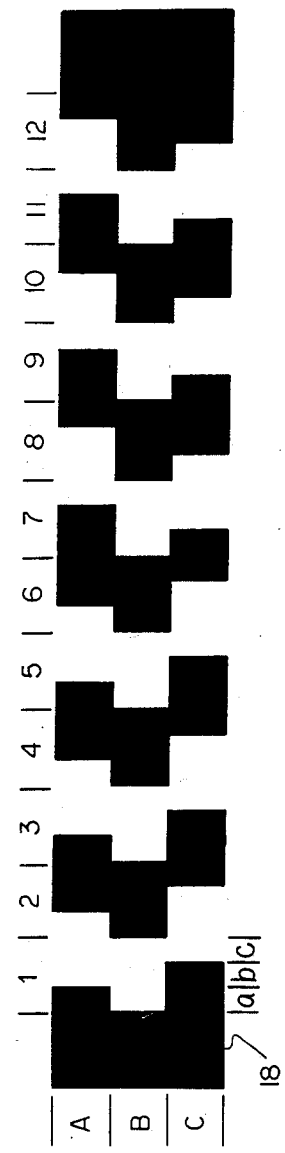
FIG. 4 is a schematic representation of the bar code according to the present invention.

Turning now to the drawings, and first of all to FIGS. 1-3, there is illustrated a typical environment for which the binary coding technique of the present invention is particularly adapted. In the manufacture of garments, it is customary to transport garments from one area to another along a conveyor on which hangers 10 are suspended, each hanger 10 carrying one garment. Within the scope of the present invention, it may be desirable to identify each garment by placing some type of code on the hanger 10. Thus, the garment may be identified from the time it is coupled with a hanger 10 until the time it is packaged as long as it remains with the hanger.

In a typical installation, hanger 10, which is some type of bracket, is suspended from a conveyor rail 12 by some type of suitable roller mechanism 14. The hanger 10 includes a hook 16 of some type from which the garments themselves are suspended. The hanger itself and the conveyor system with which it is associated are conventional equipment and do not form a unique construction. In accordance with the present invention, however, the face of the hanger 10 provides a medium or area upon which a linear strip 18 of coded information may be placed. In the illustrated environment, the coded information is formed by alternating light and dark areas arranged in three parallel channels (see FIG. 4).

As the hanger 10 moves along the rail 12, it passes a reading means 20 which reads the coded information on the linear strip 18 and transmits the intelligence to some type of storage or data processing unit 22 through data transmission line 24. In the illustrated embodiment, the reading means 20 includes three photocells 25 in alignment with the path of the three channels on the linear strip 18. As the hanger 10 passes thereby, the photocells provide an input to a microprocessor unit 26 indicative of the binary coded information contained on each channel of the linear strip 18 passing thereby. The microprocessor 26 then combines internally the three readings from linear strip 18, determines the validity of the readings, and passes the result along the data transmission line 24 to the storage or processing unit 22. The arrangement of the photocells 25 and microprocessor 26 to transform the coded information into electronic signals indicative of the identifying information is a conventional data processing technique, which is easily developed by persons of ordinary skill in the art and need not be further explained herein. It is the code arrangement itself and the manner in which it triggers binary information which is at the heart of the present invention, and not the electronics involved.

Turning now to FIG. 4, there is illustrated the three channel binary code as developed for the present invention. First of all, the linear strip 18 illustrated in FIGS. 1 and 2 is shown in enlarged detail in FIG. 4. The linear strip 18 is divided into three parallel, longitudinally extending channels A, B, and C. Longitudinally, strip 18 is divided into twelve segments 1-12. Each segment is representative of a bit of a twelve bit binary number. In the illustrated embodiment, twelve binary digits will enable a binary coded system to identify 4,096 different objects (in this case hangers 10). In reading the code, as in entering digits into an electronic calculator, the first bit read or entered is indicative of the least significant integer, while the last bit entered is indicative of the greatest significant integer. Thus, if the first eleven segments indicate ZEROS, and the last segment indicates a ONE, then the object identified is number 1.

Each segment 1-12 is further subdivided into subsegments a, b, and c. Three successive subsegments equal a segment and thus one bit of binary information. Each subsegment of each channel is coded with either a true or false indicating means. In the embodiment shown in FIG. 4 such indicating means are dark or light areas. Alternative types of indicating means could be opaque and transparent, holes and solid areas, pegs or pins of two different heights, or other physical attributes which indicate one of two possible states.

The three channels A, B, C are positioned relative to the reading means such that exactly one channel changes its logical state during each segment (unit of time) as the object passes the reader. Preferably, and as illustrated in FIG. 4, the changes in state occur at equal times (or distance) but other spacings could be used. A single bit of binary information is generated after each of the three channels has changed its logical state. The order of the transitions determines if the decoded bit is assigned the value ZERO or ONE. Further, the order of transitions determine if the object being examined is moving in the forward (normal) direction or the reverse direction, so that a decoding algorithm may correct any errors caused by such erratic movement.

In encoding or reading the three channel code the following relationships should first be understood. The first transition to occur as each segment 1-12 passes the reading means is the timing channel or clock. The next transition is either the ONES data channel (channel C) or the ZEROS data channel (channel A) depending on the order of the transition, while the last transition is the remaining data channel. The order or sequence in which the coding channels A, C change logic state determines the value of the bit being read. In the illustrated embodiment, the center channel is the timing channel and the outer channels are the coding channels. This arrangement is not critical, however, as the coding channels could be adjacent each other.

At the time of any transition given the current state of the three channels and the condition of the previous state (in memory), it may be determined if the data is valid or invalid, and if the motion is forward or reversed since reverse motion will cause the opposite transition of the last channel read. The following explanation is illustrtaive of the manner in which the reading or sensing means determines that the binary number illustrated on the linear strip 18 in FIG. 4 is the binary equivalent of the decimal figure 4,032.

First, the reading commences at the left end of the strip 18. As the segment 1 passes the reading means, the center channel B changes state from black to white.

This indicates that the reading of a bit is commencing. It is very important to keep in mind from this point on that in each segment, if channel A changes its logical state prior to channel C, the bit reading is a ZERO. On the other hand, if channel C changes its logical state prior to channel A in any segment, then such reading is a ONE. It should also be kept in mind that the absolute logical state of the three channel code at any one instant or subsegment is meaningless without relating it to its prior states.

Thus, since channel A changes its logical state first in segment 1, the bit reading from segment 1 is a ZERO. Moving on to segment 2, the timing channel B changes from light to dark indicating a new bit reading is about to commence. In segment 2, channel A once again changes its logic state prior to channel B. Again, this is indicative of a ZERO bit reading. As the reading commences it can be seen that all segments 1-6 are representative of ZEROS.

Commencing with segment 7, however, a different reading occurs. As segment 7 is entered, the center channel B changes from dark to light, indicating the new reading is commencing. However, it should be noted now that channel C changes its logic state prior to channel A. This is indicative of a ONE reading. The same holds true for channels 8-12.

Thus, the binary number indicated in FIG. 4 is 111111000000. This is the binary equivalent of the decimal value 4,032.

By way of illustration, the heretofore described bar code is capable of determining erratic movement of the hanger 10 and responding thereto in an appropriate manner. For example, assume that during the reading of a code, the reading means is entering segment 3. If the reader does not sense the change of state in the timing channel B at the outset of segment 3, it realizes that an error has been made. Either the linear strip 18 and thus the garment hook 10 have reversed direction, or else it has jumped forwardly skipping a portion of the coded information. The same is true after the reading means has designated a proper clock change in center channel B. If the next change is another change in the timing channel B, then the linear strip 18 has reversed direction. If the next transition includes a change in logic state of both coding channels A,C, then the linear strip 18 has jumped forwardly omitting some data. The point here is that in order for a correct reading to occur, during each segment, each channel must change its logic state once and only one channel changes its logic state at any given transition.

Figure 5:
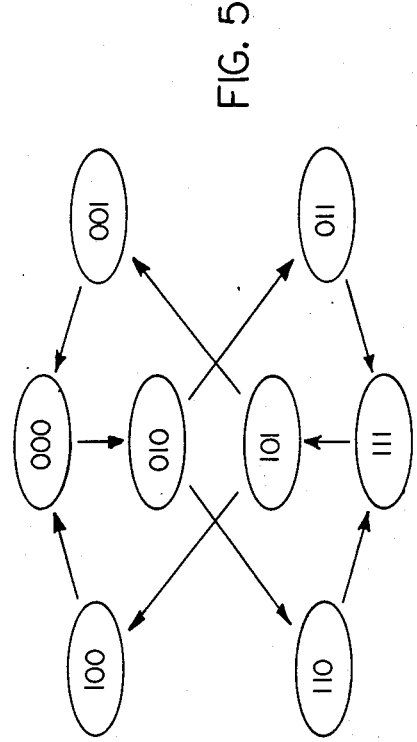
FIG. 5 is a graphic representation of the possible transitions from one state to another showing which transitions are valid, which are reversed in direction, and which are invalid.

The graphic representation of FIG. 5 illustrates all possible transitions from one segment to the next. The middle channel data bit is the clock, the top channel A is the ZEROS data and the bottom channel C is ONES data. Assuming the starting point to be 000, which is the state of the reader output in the absence of an object to be read. During the transition from 000 to 111, only two possible correct paths exist. In order for the reading to be valid, the first step must be a transition from 000 to 010 indicating that the clock channel has made a change. Then, the next valid change may be either from 010 to 110 indicating a ONES digit or from 010 to 011 (indicating a ZERO digit). Finally, the last transition must be from either 110 to 111 or from 011 to 111, so that upon completion of the segment, the logic states of all channels have gone from 000 to 111 in one of the two prescribed paths. No other path in FIG. 5 is valid.

Still referring to FIG. 5, once all channels are in the logic state 111, the only return path is first to logic state 101, then either to 001 or to 100 and back then to 000.

There has thus been shown and described a unique approach to a bar code which is particularly adaptable for identifying intermittently, erratically, or continuously moving objects along a linear path. In achieving this invention, the reading means senses the order of change in each of the three channels, rather than the condition of the three channels at any instant.

While a preferred embodiment of the invention has been described in detail hereinabove, it is apparent that various changes and modifications might be made without departing from the scope of the invention which is set forth in the accompanying claims.

What is claimed is:

1. Apparatus for generating coded information in binary form which can be read by a reading means, said apparatus comprising:
   (a) a medium including a linear strip of coded information thereon;
   (b) said linear strip comprising a pattern of three parallel channels of said coded information, one of said channels being a timing channel and the other two channels being a first and second channel;
   (c) each of said channels including indicating means associated therewith representative of one of two logic states, which logic states change at prescribed intervals along the channel;
   (d) said medium being movable relative to said reading means;
   (e) said reading means including sensing means for determining separately the change in logic states in each channel as the indicating means passes thereby;
   (f) said pattern of channels being divided into longitudinal segments and sub-segments sequential segments binarily representng successive bits of a binary number, the passing of three successive sub-segments equalling a segment and thus one bit of binary information;
   (g) the logic state of said channels in each segment and subsequent being arranged in a prescribed pattern wherein the change of logic states in one channel is indicative of when a new bit reading commences, and the order or sequence in which transitions of said logic states occur in the other two channels is indicative of whether the bit is a ONE or ZERO, or whether the reading is valid or erroneous.

2. The apparatus according to claim 1 wherein said sensing means are selected from the group comprised of photodetectors, mechanical detectors, electrical switch contacts, and electrical sensors.

3. Apparatus for generating coded information in binary form which can be read by a reading means, said apparatus comprising:
   (a) a medium including a linear strip of coded information;
   (b) said linear strip comprising a plurality of parallel channels of said coded information, each of said channels including thereon indicating means associated therewith representative of one of two logic states, which logic states change at prescribed intervals along the channels;
   (c) said medium being movable relative to said reading means;

(d) said reading means including sensing means for determining separately the logic states from each channel as the indicating means pass thereby;

(e) said indicating means being so arranged within said channels as to indicate intelligence as a result of the order in which said indicating means change logic states along said plurality of channels rather than as a result of the instantaneous combination of said indicating means which exist transversely across said channels.

4. A multi-channel binary code including a plurality of indicating means in each channel, the binary reading of said code beng a function of the order in which said indicating means change logic states along said channels relative to each other as relative movement between the indicating means and a reading means occurs.

* * * * *